(12) United States Patent
Kim

(10) Patent No.: US 10,039,012 B2
(45) Date of Patent: Jul. 31, 2018

(54) APPARATUS AND METHOD FOR CELL MANAGEMENT IN MOBILE COMMUNICATION SYSTEM BASED ON BEAM FORMING SCHEME, AND MOBILE COMMUNICATION SYSTEM

(71) Applicant: ELECTRONICS AND TELECOMMUNICATIONS RESEARCH INSTITUTE, Daejeon (KR)

(72) Inventor: Jin Kyeong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/408,794

(22) Filed: Jan. 18, 2017

(65) Prior Publication Data
US 2017/0208481 A1 Jul. 20, 2017

(30) Foreign Application Priority Data
Jan. 19, 2016 (KR) ........................ 10-2016-0006627

(51) Int. Cl.
*H04W 16/28* (2009.01)
*H04W 84/04* (2009.01)

(52) U.S. Cl.
CPC .......... *H04W 16/28* (2013.01); *H04W 84/042* (2013.01)

(58) Field of Classification Search
CPC .. H04W 28/0231; H04W 16/28; H04W 36/20
See application file for complete search history.

(56) References Cited

U.S. PATENT DOCUMENTS

| | | | |
|---|---|---|---|
| 7,965,672 B2 | 6/2011 | Kim | |
| 9,363,728 B2 | 6/2016 | Choi et al. | |
| 2011/0039567 A1 | 2/2011 | Lee et al. | |
| 2014/0295859 A1 | 10/2014 | Shin et al. | |
| 2015/0146686 A1* | 5/2015 | Huang | H04W 36/08 370/331 |
| 2016/0127943 A1* | 5/2016 | Shaw | H04W 28/0231 370/230 |

FOREIGN PATENT DOCUMENTS

| | | |
|---|---|---|
| KR | 10-2007-0090847 A | 9/2007 |
| KR | 10-2014-0045887 A | 4/2014 |

* cited by examiner

*Primary Examiner* — Myron K Wyche
(74) *Attorney, Agent, or Firm* — Rabin & Berdo, P.C.

(57) ABSTRACT

An apparatus for cell management in a mobile communication system based on a beam forming scheme includes: a storage unit storing a cell management scenario for at least one floating cell inlayed with a fixed cell of a base station and managed by the base station or other base stations; a determination unit determining a processing scheme of the at least one floating cell on the basis of the cell management scenario stored in the storage unit when a service request event is generated within the fixed cell; and a controller processing the at least one floating cell on the basis of the cell management scenario corresponding to the determined processing scheme.

19 Claims, 18 Drawing Sheets

FIG. 5
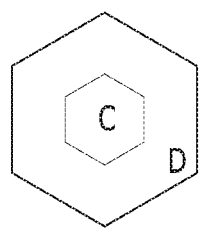
(a)
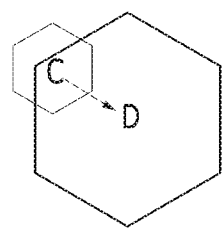
(b)
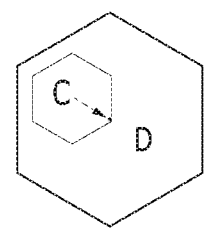
(c)

APPARATUS AND METHOD FOR CELL MANAGEMENT IN MOBILE COMMUNICATION SYSTEM BASED ON BEAM FORMING SCHEME, AND MOBILE COMMUNICATION SYSTEM

CROSS-REFERENCE TO RELATED APPLICATION

This application claims priority to and the benefit of Korean Patent Application No. 10-2016-0006627 filed in the Korean Intellectual Property Office on Jan. 19, 2016, the entire contents of which are incorporated herein by reference.

BACKGROUND OF THE INVENTION (a) Field of the Invention

The present invention relates to an apparatus and a method for cell management in a mobile communication system based on a beam forming scheme and a mobile communication system.

(b) Description of the Related Art

Recently, to cope with an explosive increase in mobile data traffic, a mobile communication system using a beam forming scheme has been in the limelight as one of next-generation mobile communication technologies. In particular, the beam forming scheme forms various types of beam patterns directing a specific direction by arranging a plurality of antennas and adjusting a size and a phase of output signals of the arranged antennas, and therefore has strong straightness to very easily generate small cells to which beam forming technologies are applied and simultaneously generate a plurality of small cells overlapped within the existing cellular cell, such that it seems to sufficiently handle the mobile data traffic.

However, a base station centric fixed cell of the existing cellular mobile communication system has only a concept of reducing or increasing the size of the cell in consideration of a load applied to the cell, or the like, but the mobile communication system based on the beam forming scheme may generate various cell management events such as generation, extinction, separation, coupling, and expansion of the cell if necessary.

Therefore, the apparatus and method for cell management in a mobile communication system based on a cellular scheme is difficult to manage the cell of the mobile communication system based on the beam forming scheme, and therefore a cell management scheme meeting the mobile communication system based on the beam forming scheme is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for cell management in a mobile communication system based on a beam forming scheme having advantages of effectively coping with scenarios such as generation, expansion, reduction, separation, collision, coupling, and extinction of a cell in the mobile communication system based on the beam forming scheme to seamlessly provide a user with a mobile communication service based on the beam forming scheme.

Objects of the present invention are not limited to the above-mentioned objects. That is, other objects that are not mentioned may be obviously understood by those skilled in the art.

An example embodiment of the present invention provides an apparatus for cell management in a mobile communication system based on a beam forming scheme, the apparatus including: a storage unit storing a cell management scenario for at least one floating cell inlayed with a fixed cell of a base station and managed by the base station or other base stations; a determination unit determining a processing scheme of the at least one floating cell on the basis of the cell management scenario stored in the storage unit when a service request event is generated within the fixed cell; and a controller processing the at least one floating cell depending on the determination of the determination unit.

The cell management scenario may store at least one of an operation policies, operation conditions, and setup values, respectively, for generation, expansion, reduction, separation, collision avoidance, coupling, and extinction of a cell.

The at least one floating cell may comprise a first floating cell and the cell management scenario may comprise a cell expansion scenario. The determination unit may determine whether a cell expansion of the first floating cell is made on the basis of the cell expansion scenario when the first floating cell is present within a set distance from the terminal apparatus.

The controller may expand the first floating cell on the basis of the cell expansion scenario when it is confirmed that the cell expansion of the first floating cell is made and determine a central location of the expanded first floating cell depending on a transmission quality state of the terminal apparatus included in the expanded first floating cell so that entire transmission capacity within the expanded first floating cell is maximal.

The at least one floating cell may comprise a first floating cell and a second floating cell and the cell management scenario may comprise a cell generation scenario and a cell separation scenario. The determination unit may determine whether a generation or a separation of the second floating cell corresponding to the terminal apparatus is made on the basis of the cell generation scenario or the cell separation scenario, when the first floating cell is not present within a set distance from the terminal apparatus.

The determination unit may confirm a cell separation reference on the basis of the cell separation scenario and determine whether the separation of the second floating cell corresponding to the terminal apparatus from the floating cell is made depending on the confirmed cell separation reference.

The at least one floating cell may comprise a first floating cell and a second floating cell. The determination unit may determine whether a separation of the second floating cell corresponding to a first terminal apparatus from the first floating cell is made on the basis of at least one of cell information of the first floating cell and a location of the first terminal apparatus when the first terminal apparatus of a plurality of terminal apparatuses included in the first floating cell moves to an outside of the first floating cell.

The at least one floating cell may comprise a first floating cell. The controller may change a service providing channel of the first floating cell including a first terminal apparatus from a first channel to a second channel when cell collision information is received from the first terminal apparatus receiving services provided by the first floating cell inlayed within the fixed cell of the base station.

The controller may recover the service providing channel of the first floating cell including the first terminal apparatus to the first channel when cell collision release information is received from the first terminal apparatus.

The controller may couple the first floating cell and a second floating cell when the first floating cell and the second floating cell confirmed from the cell collision information maintain an inlayed state for a set time or more.

The controller may select one of service providing channels of the first floating cell and the second floating cell and determine the selected service providing channel as a service providing channel of the coupled floating cell.

The controller may notify the other base stations of a cell coupling request when at least one of the first floating cell and the second floating cell confirmed from the cell collision information is managed by the other base stations.

The at least one floating cell may comprise a first floating cell. The controller may perform extinction of the first floating cell when a release request of the service provided by the first floating cell is received from a first terminal apparatus receiving services provided by the first floating cell inlayed within the fixed cell of the base station.

The at least one floating cell may comprise a plurality of first floating cell. The controller may inlay the plurality of first floating cells having different coverages with each other depending on a plurality of available service channels.

The service request event may be requested by at least one of the terminal apparatuses located within coverage of the fixed cell.

The service request event may be requested by the base station when traffic is offloaded for a load dispersion of the fixed cell.

The at least one floating cell may comprise a first floating cell. The base station may provide a first terminal apparatus within the first floating cell with a mobile communication service based on a beam forming scheme and provide a second terminal apparatus not included in the first floating cell, but included in the fixed cell, with a mobile communication service based on a cellular scheme.

Another embodiment of the present invention provides a method for cell management in a mobile communication system based on a beam forming scheme, the method including: storing a cell management scenario for at least one floating cell inlayed with a fixed cell of a base station and managed by the base station or other base stations; determining a processing scheme of the at least one floating cell on the basis of the cell management scenario when a service request event is generated within the fixed cell; and processing the at least one floating cell depending on the determination.

Yet another embodiment of the present invention provides a mobile communication system, including: a base station providing a first terminal apparatus within a fixed cell of a base station with a mobile communication service based on a cellular scheme and providing a second terminal apparatus included in at least one floating cell inlayed with the fixed cell and managed by the base station or other base stations with a mobile communication service based on a beam forming scheme; and an cell management apparatus storing a cell management scenario in which cell management information on a generation, expansion, reduction, separation, coupling, or extinction operation of the at least floating cell is recorded and processing the at least floating cell on the basis of the cell management scenario.

BRIEF DESCRIPTION OF THE DRAWINGS

FIG. 3, FIG. 4, FIG. 5, FIG. 6, FIG. 7, FIG. 8, FIG. 9, FIG. 10, FIG. 11, FIG. 12, FIG. 13, and FIG. 14 are diagrams illustrating an example referenced to describe an operation of the apparatus for cell management in a mobile communication system according to the exemplary embodiment of the present invention.

DETAILED DESCRIPTION OF THE EMBODIMENTS

Figure 1:
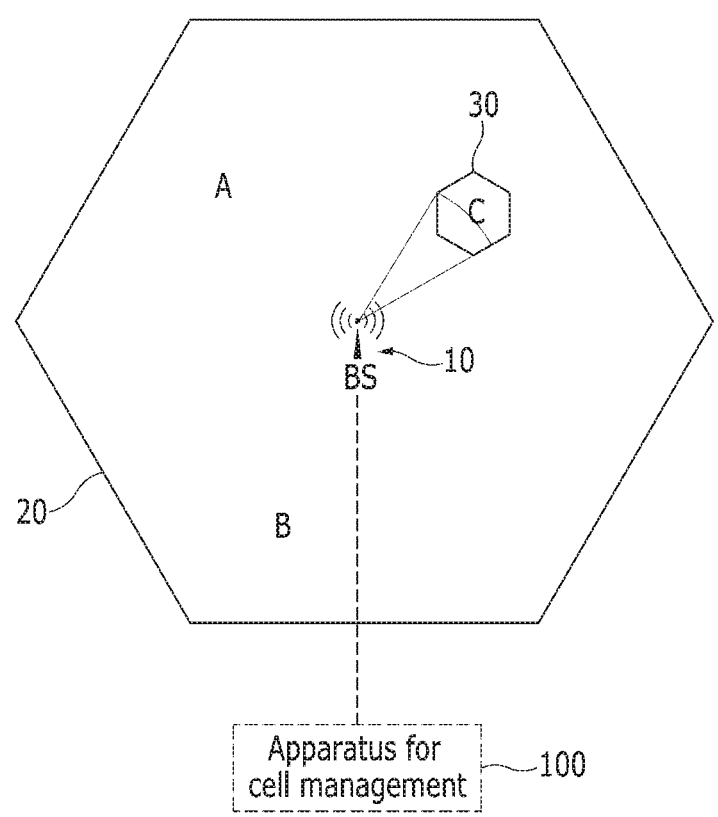
FIG. 1 is a diagram illustrating a configuration of a mobile communication system according to an exemplary embodiment of the present invention.

Hereinafter, exemplary embodiments of the present invention will be described with reference to the accompanying drawings. It is to be noted that in giving reference numerals to components of each of the accompanying drawings, the same components will be denoted by the same reference numerals even though they are shown in different drawings. Further, in describing exemplary embodiments of the present invention, well-known constructions or functions will not be described in detail in the case in which it is decided that they may unnecessarily obscure the understanding of the present invention.

In describing components of the exemplary embodiment of the present invention, terms such as first, second, A, B, (a), (b), etc. may be used. These terms are used only to differentiate the components from other components. Therefore, the nature, times, sequence, etc. of the corresponding components are not limited by these terms. Unless indicated otherwise, all the terms used in the present specification, including technical or scientific terms, have the same meanings as meanings that are generally understood by those skilled in the art to which the present invention pertains. It must be understood that the terms defined by the dictionary generally used having meanings identical with the meanings within the context of the related art, and they should not be ideally or excessively formally defined unless the context clearly dictates otherwise.

It is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, in the present specification, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

Further, in the present specification, a terminal apparatus may refer to a terminal, a mobile terminal, a mobile station, an advanced mobile station, a high reliability mobile station, a subscriber station, a portable subscriber station, an access terminal, user equipment, and the like and may also include all or some of the functions of the terminal apparatus, the terminal, the mobile terminal, the mobile station, the advanced mobile station, the high reliability mobile station, the subscriber station, the portable subscriber station, the access terminal, the user equipment, and the like.

Further, in the present specification, a base station (BS) may refer to an advanced base station, a high reliability base station, a nodeB, an evolved node B (eNodeB, eNB), an access point, a radio access station, a base transceiver station, a mobile multihop relay (MMR)-BS, a relay station serving as a base station, a high reliability relay station serving as a base station, a repeater, a macro base station, a small base station, and the like and may also include all or some of the functions of the base station, the advanced base station, the HR-BS, the nodeB, the eNodeB, the access point, the radio access station, the base transceiver station, the MMR-BS, the relay station, the high reliability relay station, the repeater, the macro base station, the small base station, and the like.

FIG. 1 is a diagram illustrating a configuration of a mobile communication system according to an exemplary embodiment of the present invention.

Referring to FIG. 1, a base station (BS) 10 may provide terminal apparatuses A, B, and C located within a base station centric fixed cell (hereinafter, referred to as 'fixed cell') 20 with a mobile communication service based on a cellular scheme.

Here, a mobile communication service based on a cellular scheme is a service that supports a data transmission speed of a low speed and/or a medium speed. Therefore, the base station 10 provides the mobile communication system based on the cellular scheme to enable the terminal apparatus located within the fixed cell 20 of the base station 10 to use a low speed and/or medium speed voice and/or a compression HD class image service.

In this case, the base station 10 always provides the terminal apparatus located within the fixed cell 20 with the mobile communication service based on the cellular scheme.

Meanwhile, the terminal apparatus receiving the mobile communication service based on the cellular scheme within the fixed cell 20 may request a data transmission speed of a high speed to the base station 10 to use a service provided by a floating cell. By doing so, the base station 10 may generate a user centric floating cell (hereinafter, referred to as 'floating cell') 30 on the basis of a location of the corresponding terminal apparatus and provide the terminal apparatus located within the floating cell 30 with the mobile communication service based on the beam forming scheme.

Further, the base station 10 may also generate the floating cell spontaneously when wanting to offload traffic of the fixed cell 20 for a load dispersion.

Here, the mobile communication service based on the beam forming scheme is a service that supports the data transmission speed of the high speed or a service that disperses traffic to low speed and medium speed data services as a target in order to offload the traffic for coping with congestion. Therefore, the base station 10 provides the terminal apparatus within the floating cell 30 with the mobile communication service based on the beam forming scheme to enable the corresponding terminal apparatus to use a high-speed compression UHD class image service, an online game service requiring a low latency speed, or the like.

In this case the base station 10 temporarily provides the mobile communication service based on the beam forming scheme only when there is the request.

The exemplary embodiment of the present invention describes that one base station 10 provides both of the mobile communication service based on the cellular scheme and the mobile communication service based on the beam forming scheme, but is not limited thereto and therefore the base station providing the mobile communication service based on the beam forming scheme may also be operated while being implemented within the mobile communication network of the base station providing the mobile communication service based on the cellular scheme.

The base station 10 according to the exemplary embodiment of the present invention may include an apparatus 100 for cell management. The apparatus 100 for cell management according to the exemplary embodiment of the present invention may be implemented within the base station 10. At this time, the apparatus 100 for cell management may be integrally formed with control units of the base station 10. Meanwhile, the apparatus 100 for cell management according to the exemplary embodiment of the present invention may be implemented as a separate apparatus from the base station 10 to be connected to the control units of the base station 10 by a connection means. Therefore, a detailed configuration of the apparatus 100 for cell management according to the exemplary embodiment of the present invention will be described in more detail with reference to the exemplary embodiment of FIG. 2.

Figure 2:
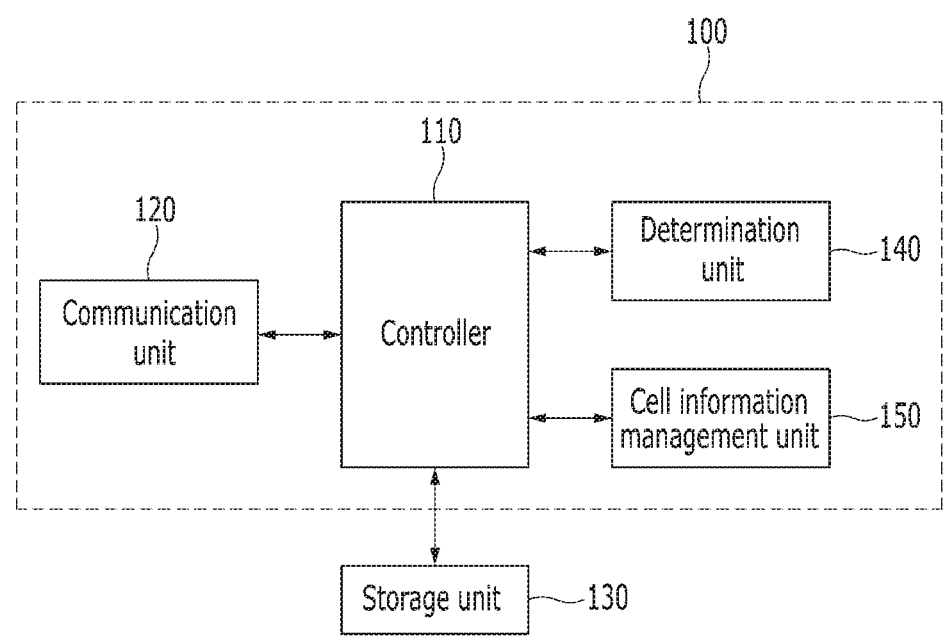
FIG. 2 is a diagram illustrating a configuration of an apparatus for cell management in a mobile communication system according to an exemplary embodiment of the present invention.

FIG. 2 is a diagram illustrating a configuration of an apparatus for cell management in a mobile communication system according to the exemplary embodiment of the present invention.

Referring to FIG. 2, the apparatus 100 for cell management according to the exemplary embodiment of the present invention may include a controller 110, a communication unit 120, a storage unit 130, a determination unit 140, and a cell information management unit 150. In this configuration, the controller 110 may process a signal transferred between each part of the apparatus for cell management.

The communication unit 120 may include a communication module that supports communication with the terminal apparatuses within a server and/or the fixed cell and/or the floating cell. At this point, the communication module may include a module for radio internet access and a module for short range communication.

Here, a radio internet technology may include wireless LAN (WLAN), wireless broadband (Wibro), Wi-Fi, world interoperability for microwave access (Wimax), high speed downlink packet access (HSDPA), LTE, LTE-advanced, or 5G mobile communication technologies using a cellular band, or the like and a short range communication technology may include Bluetooth, ZigBee, ultra wideband (UWB), radio frequency identification (RFID), infrared data association (IrDA), IEEE802.11ad, IEEE802.15.3c, or the like.

Further, the communication unit 120 may also include a communication module that supports communication with the control unit of the base station. In this case, the communication module may include a module for wired communication. Here, the wired communication technology may include Ethernet, universal serial bus (USB) communications, or the like.

The storage unit 130 may store data and programs required to operate the apparatus 100 for cell management.

For example, the storage unit 130 may store cell management scenarios corresponding to generation, expansion, reduction, separation, collision, coupling, and extinction of a cell. Here, the cell management scenarios may each store an operation policy, an operation condition, a setup value, or the like for the generation, expansion, reduction, separation, collision, coupling, and extinction of the cell. Further, the storage unit 130 may also store information on the terminal apparatus requesting the mobile communication service and information on the mobile communication service based on the beam forming scheme provided to the corresponding terminal apparatus.

Here, the storage unit 130 may include at least one storage medium of a random access memory (RAM), a static random access memory (SRAM), a read-only memory (ROM), a programmable read-only memory (PROM), and an electrically erasable programmable read-only memory (EEPROM). Further, the storage unit is not limited thereto and any storage medium that may store information may be used.

The controller 110 processes the operations of the generation, expansion, reduction, separation, collision avoidance, coupling, extinction, or the like of the cell depending on the cell management scenario stored in the storage unit 130.

When a service request event provided by the floating cell is generated within the fixed cell, the determination unit 140 confirms the operation condition information corresponding to the generation, expansion, reduction, separation, collision, coupling, and extinction of the cell from the cell management scenario and determines whether to execute the cell management scenario corresponding to at least one thereof. Here, the service request event may be requested by at least one of the terminal apparatuses located within coverage of the fixed cell. Meanwhile, the service request event may also be requested by the base station to offload the traffic of the fixed cell for a load dispersion. However, the following exemplary embodiment will be described as an exemplary embodiment requested by the terminal apparatus.

For example, when a second terminal apparatus requests the service provided by the floating cell in the state in which the mobile communication service based on the beam forming scheme is provided to a first terminal apparatus within the fixed cell, the determination unit 140 may determine whether to additionally generate the floating cell corresponding to the second terminal apparatus, whether to accept the second terminal apparatus by expanding the floating cell corresponding to the first terminal apparatus, or whether to separate the floating cell corresponding to the first terminal apparatus.

Therefore, the controller 110 selects at least one cell management scenario depending on the determination result of the determination unit 140 among the cell management scenario stored in the storage unit 130 and performs a control depending on the selected cell management scenario.

The detailed operations of the generation, expansion, reduction, separation, collision, coupling, and extinction of the cell depending on the cell management scenario selected by the controller 110 will be described with reference to FIGS. 3 to 14.

The cell information management unit 150 may manage operation policies, operation conditions, setup values, or the like that are stored in the cell management scenarios stored in the storage unit 130, that is, a cell generation scenario, a cell expansion scenario, a cell reduction scenario, a cell separation scenario, a cell collision scenario, a cell coupling scenario, and a cell extinction scenario, respectively.

For example, when the operation policy is changed, the cell information management unit 150 may renew the operation policies stored in the cell management scenarios and may also modify, add, and/or delete the operation conditions, the setup values, or the like according to the exemplary embodiment or a request of an operator.

Figure 3:
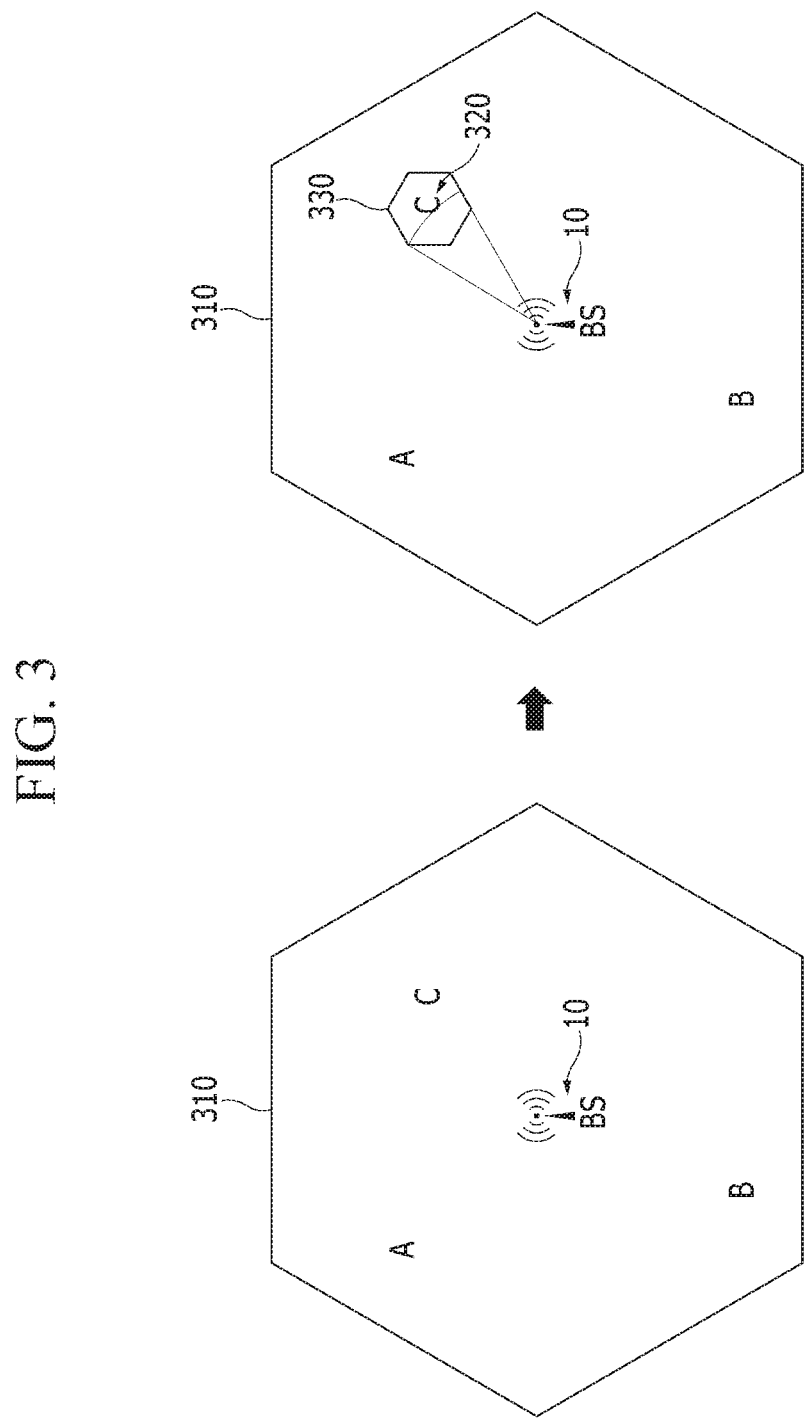

FIG. 3 illustrates the cell generation scenario.

As illustrated in FIG. 3, the base station (BS) 10 may provide the terminal apparatuses A, B, and C located within coverage of a fixed cell 310 with a mobile communication service based on a cellular scheme. When a terminal apparatus C 320 among the terminal apparatuses A, B, and C located within the coverage of the fixed cell 310 requests the service provided by the floating cell, the determination unit 140 may determine whether the cell generation, the cell expansion, or the cell separation may be made on the basis of the information stored in each cell management scenario.

At this point, the determination unit 140 may confirm whether the floating cell is present within a preset distance from the terminal apparatus C 320 and if it is confirmed that the floating cell is not present within the preset distance, may determine whether the cell generation may be made on the basis of the information stored in the cell generation scenario.

For example, the determination unit 140 may confirm whether the terminal apparatus C requests a very high speed data service that is not supported by the mobile communication service based on the cellular scheme or exceeds an arbitrarily set threshold value or whether an operator forcibly requests the very high speed data service according to the network operation policies such as traffic load dispersion to cope with congestion, thereby determining whether the cell generation may be made.

If the determination unit 140 confirms that the cell generation may be made, the controller 110 generates the floating cell 330 on the basis of the location of the terminal apparatus C 320 depending on the cell generation scenario. Therefore, the base station 10 provides the terminal apparatus C 320 located with the generated floating cell 330 with the mobile communication service based on the beam forming scheme.

Here, the floating cell 330 generated to correspond to the terminal apparatus C 320 may be generated while inlaying the fixed cell of the base station 10.

Figure 4:
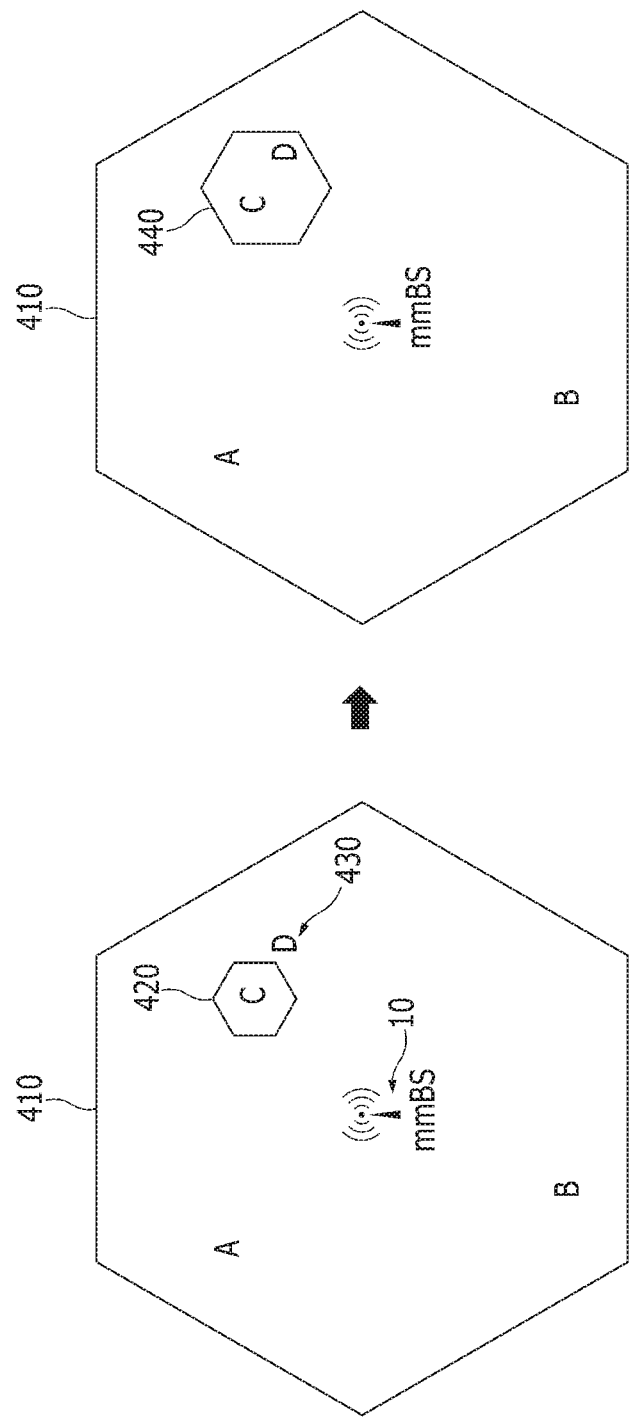

FIG. 4 illustrates the cell expansion scenario according to a first exemplary embodiment. Here, FIG. 4 illustrates an example of expanding the corresponding floating cell according to the request of the high speed data service by the other terminal apparatuses, or the like in the state in which one terminal apparatus is present within the floating cell.

As illustrated in FIG. 4, the base station (BS) 10 may provide the terminal apparatuses A, B, C, and D located within coverage of a fixed cell 410 with the mobile communication service based on the cellular scheme. If a terminal apparatus D 430 requests a high speed data service in the state in which a floating cell 420 inlaying the fixed cell 410 and corresponding to the terminal apparatus C is present, the determination unit 410 may determine whether the cell generation, the cell expansion, or the cell separation may be made on the basis of the information stored in each cell management scenario.

At this point, the terminal apparatus D 430 may be a terminal that is continuously located within the fixed cell 410 to receive the mobile communication service based on the cellular scheme and may also be a terminal newly emerging by moving a location from an outside of the fixed cell 410.

Here, the determination unit 140 may confirm whether the floating cell is present within the preset distance from the terminal apparatus D 430 and if it is confirmed as illustrated in FIG. 4 that the floating cell 420 is present within the preset distance from the terminal apparatus D 430, determine whether the cell expansion may be made on the basis of the information stored in the cell expansion scenario.

For example, the determination unit 140 may determine whether the cell expansion may be made in consideration of signal strength reaching the terminal apparatuses C and D, transmission mode corresponding to the signal strength, system transmission capacity, and/or beam output correction information, or the like, when the floating cell 420 is expanded.

If the determination unit 140 confirms that the cell expansion may be made, the controller 110 expands the floating cell 420 on the basis of the location of the terminal apparatus D 430 depending on the cell expansion scenario. Therefore, the base station 10 provides the mobile communication service based on the beam forming scheme to the terminal apparatus D 430 as well as the terminal apparatus C located within the expanded floating cell 420.

If the determination unit 140 determines that the cell expansion of the floating cell 420 is not possible, the determination unit 140 may determine whether the cell generation may be made on the basis of the information stored in the cell generation scenario.

As illustrated in FIG. 4, when the existing floating cell is expanded, the controller 110 may determine an expanded direction, a range, and a central location of the floating cell depending on the locations of the terminal apparatuses C and D as illustrated in FIG. 5. Here, the controller 110 may determine the expanded direction, the range, and the central location of the floating cell on the basis of the operation policy stored in the cell expansion scenario.

First, as illustrated in (a) of FIG. 5, the controller 110 may expand the floating cell with respect to the terminal apparatus C. In this case, the floating cell may be expanded in the state in which the central location thereof does not move.

As illustrated in (b) of FIG. 5, the controller 110 may move the center of the floating cell to the terminal apparatus D when the floating cell is expanded. In this case, as the center of the floating cell moves, the terminal apparatus D is located at the center of the expanded floating cell and the terminal apparatus C may be located at the outside of the expanded floating cell.

Further, as illustrated in (c) of FIG. 5, the controller 110 may move the center of the floating cell to central locations of the terminal apparatus C and the terminal apparatus D, when the floating cell is expanded. In this case, the terminal apparatus C and the terminal apparatus D may be located at a similar distance from the center of the expanded floating cell.

Besides the disposition illustrated in FIGS. 5A to 5C, various dispositions may be possible under the conditions that may make the entire transmission capacity within the floating cell maximal.

Figure 6:
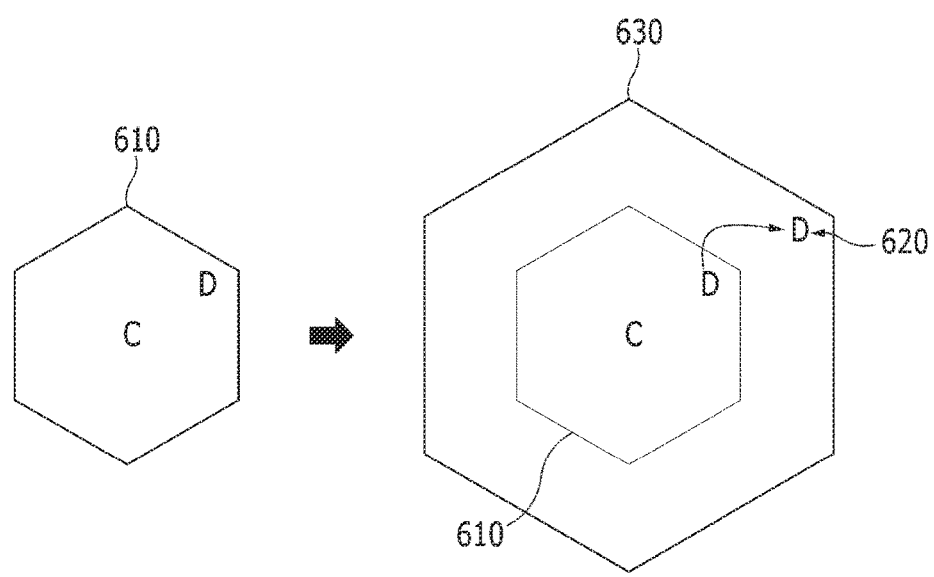

FIG. 6 illustrates the cell expansion scenario according to a second exemplary embodiment. Here, FIG. 6 illustrates an example of expanding the corresponding floating cell depending on the location movement of the terminal apparatus within the floating cell in the state in which the plurality of terminal apparatuses are present within the floating cell.

As illustrated in FIG. 6, if the location of the terminal apparatus D of the terminal apparatuses C and D within a floating cell 610 moves to an outside of the floating cell 610, the controller 110 may expand the floating cell 610 in consideration of the moved location of the terminal apparatus D.

If the location of the terminal apparatus D moves to the outside of the floating cell 610 within a set range, the controller 110 may determine, on the basis of the locations of the terminal apparatus C and the terminal apparatus D, a central location of the floating cell 610 under the condition that makes the entire transmission capacity within the floating cell maximal and expands the corresponding floating cell 610.

Therefore, the base station may continuously provide the mobile communication service based on the beam forming scheme that is provided to the terminal apparatuses C and D within the expanded floating cell 630.

Meanwhile, if the location of the terminal apparatus D moves to the outside of the floating cell 610 to be out of the set range, the controller 110 may separate the floating cell 610 or generate a new floating cell to support a high speed data service to the terminal apparatus D. In this case, the controller 110 may perform the cell reduction scenario on the existing floating cell 610 as illustrated in FIG. 7.

Figure 7:
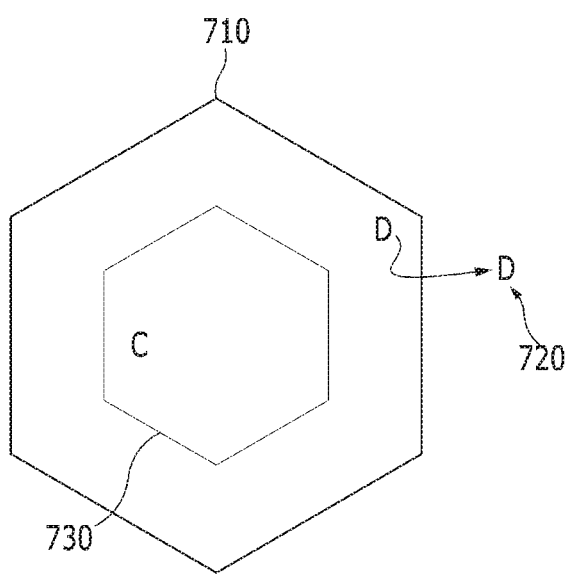

FIG. 7 illustrates the cell reduction scenario. Here, FIG. 7 illustrates an example of reducing the corresponding floating cell depending on the location movement of the terminal apparatus within the floating cell in the state in which the plurality of terminal apparatuses are present within the floating cell.

As illustrated in FIG. 7, when a location of a terminal apparatus D of terminals apparatuses C and D within a floating cell 710 moves to an outside of the floating cell D to be out of a set range of the floating cell 710, the determination unit 140 may determine whether to reduce the floating cell corresponding to the terminal apparatus C on the basis of information stored in the cell reduction scenario.

Further, the determination unit 140 may also determine whether to generate the cell or whether to separate the cell on the basis of the information stored in the cell generation scenario and/or the cell separation scenario based on the moved location of the terminal apparatus D.

The controller 110 may reduce the floating cell 710 corresponding to the terminal apparatus C depending on the cell reduction scenario and generate or separate the floating cell corresponding to the terminal apparatus D, according to the determination result of the determination unit 140.

Therefore, the base station may provide the terminal apparatus C within a reduced floating cell 730 with the mobile communication service based on the beam forming scheme.

As illustrated in FIG. 7, when the floating cell 710 is reduced to a cell including the terminal apparatus C, the controller 110 may reduce the floating cell 710 and then may also change a central location of the reduced floating cell 730 to reduce the floating cell 710 in order to locate the terminal apparatus C at a center of the reduced floating cell 730.

Meanwhile, the controller 110 may reduce the floating cell 710 corresponding to the terminal apparatus C depending on the cell reduction scenario even when the terminal apparatus D of the terminal apparatuses C and D within the floating cell 710 requests the service provided by the floating cell to be released.

Figure 8:
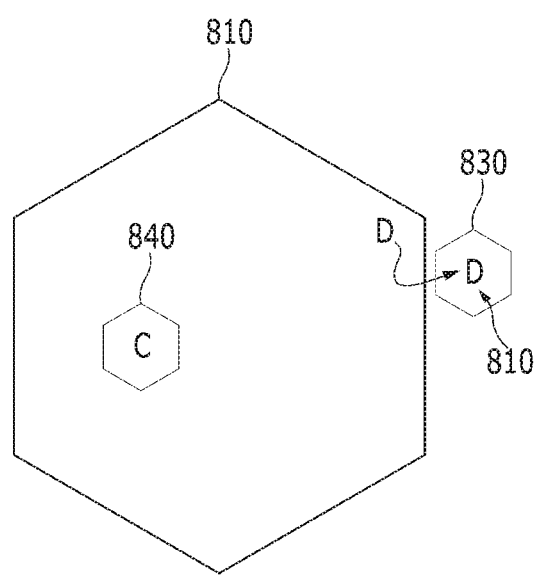

FIG. 8 illustrates the cell separation scenario according to the first exemplary embodiment. Here, FIG. 8 illustrates an example of separating the corresponding floating cell depending on the location movement of the terminal apparatus within the floating cell in the state in which the plurality of terminal apparatuses are present within the floating cell.

As illustrated in FIG. 8, when a location of a terminal apparatus D 820 of terminals apparatuses C and D within a floating cell 810 moves to an outside of the floating cell D 820 to be out of a set range of the floating cell 810, the determination unit 140 may determine whether a floating cell 830 corresponding to the terminal apparatus D 820 may be separated from the floating cell 810 on the basis of information stored in the cell separation scenario.

If the determination unit 140 confirms that the cell separation may be made, the controller 110 may separate the floating cell 830 corresponding to the terminal apparatus D 820 from the existing floating cell 810.

Therefore, the base station may provide the terminal apparatus D within the separated floating cell 830 with the mobile communication service based on the beam forming scheme. In this case, to minimize a signal interference between the terminal apparatuses C and D, the base station may provide the terminal apparatus D within the separated floating cell 830 with the mobile communication service based on the beam forming scheme through a channel different from a channel of the existing floating cell 810.

Meanwhile, the determination unit 140 may separate the floating cell 830 corresponding to the terminal apparatus D 820 from the floating cell 810 and then determine whether to reduce the cell of the floating cell 810 corresponding to the terminal apparatus C. At this time, the determination unit 140 may determine whether to reduce the cell on the basis of the information stored in the cell reduction scenario.

If the determination unit 140 confirms that the cell reduction may be made, the controller 110 may reduce the floating cell 810 corresponding to the terminal apparatus C depending on the cell reduction scenario. Therefore, the base station may provide the terminal apparatus C within the reduced floating cell 840 with the mobile communication service based on the beam forming scheme.

Figure 9:
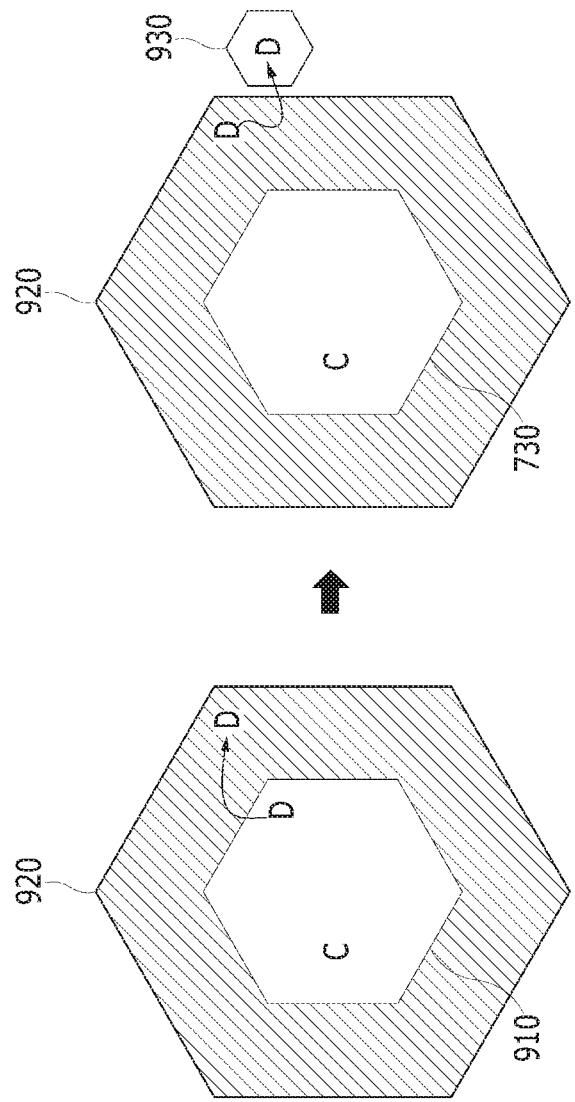

FIG. 9 illustrates the cell separation scenario according to a second exemplary embodiment. Here, FIG. 9 illustrates an example of separating the floating cell depending on the location movement of the terminal apparatus within the floating cell in the state in which the plurality of terminal apparatuses are present within two floating cells generated to correspond to two available channels.

As illustrated in FIG. 9, when the number of available channels is two, the controller 110 may configure a first floating cell 910 providing the requested service to the terminal apparatuses C and D and configure a second floating cell 920 of a larger area that is at an outside of the first floating cell 910 to include the floating cell 910. Therefore, the base station may provide the terminal apparatuses C and D within the first floating cell 910 with the mobile communication service based on the beam forming scheme through a first channel.

In the exemplary embodiment of FIG. 9, the controller 110 determines cell separation timing for the corresponding terminal apparatus based on timing at which the location of the terminal apparatus moves to the outside second floating cell 920.

In other words, if the location of the terminal apparatus D within the first floating cell 910 moves to an area of the second floating cell 920, the base station may provide the terminal apparatus C within the first floating cell 910 with the mobile communication service based on the beam forming scheme through the first channel and provide the terminal apparatus D within the second floating cell 920 with the mobile communication service based on the beam forming scheme through the second channel.

As such, if the location of the terminal apparatus D moves to the outside of the second floating cell 920 in the state in which the mobile communication service based on the beam forming scheme is provided to the terminal apparatus C and the terminal apparatus D, respectively, through different channels, the determination unit 140 may determine, on the basis of the information stored in the cell separation scenario, whether the floating cell 930 corresponding to the terminal apparatus D may be separated from the second floating cell 920 after the generation of the floating cell 930.

If the determination unit 140 confirms that the cell generation and the cell separation are possible, the controller 110 may generate the floating cell 930 corresponding to the terminal apparatus D and then separate the floating cell 930 from the second floating cell 920.

In this case, since the terminal apparatus C located around the terminal apparatus D receives the mobile communication service based on the beam forming scheme through the first channel, the floating cell 930 separated from the second floating cell 920 to correspond to the terminal apparatus D may little cause the channel interference even if it receives the mobile communication service based on the beam forming scheme through the same channel (channel different from the first floating cell 910) as the second floating cell 920.

Figure 10:
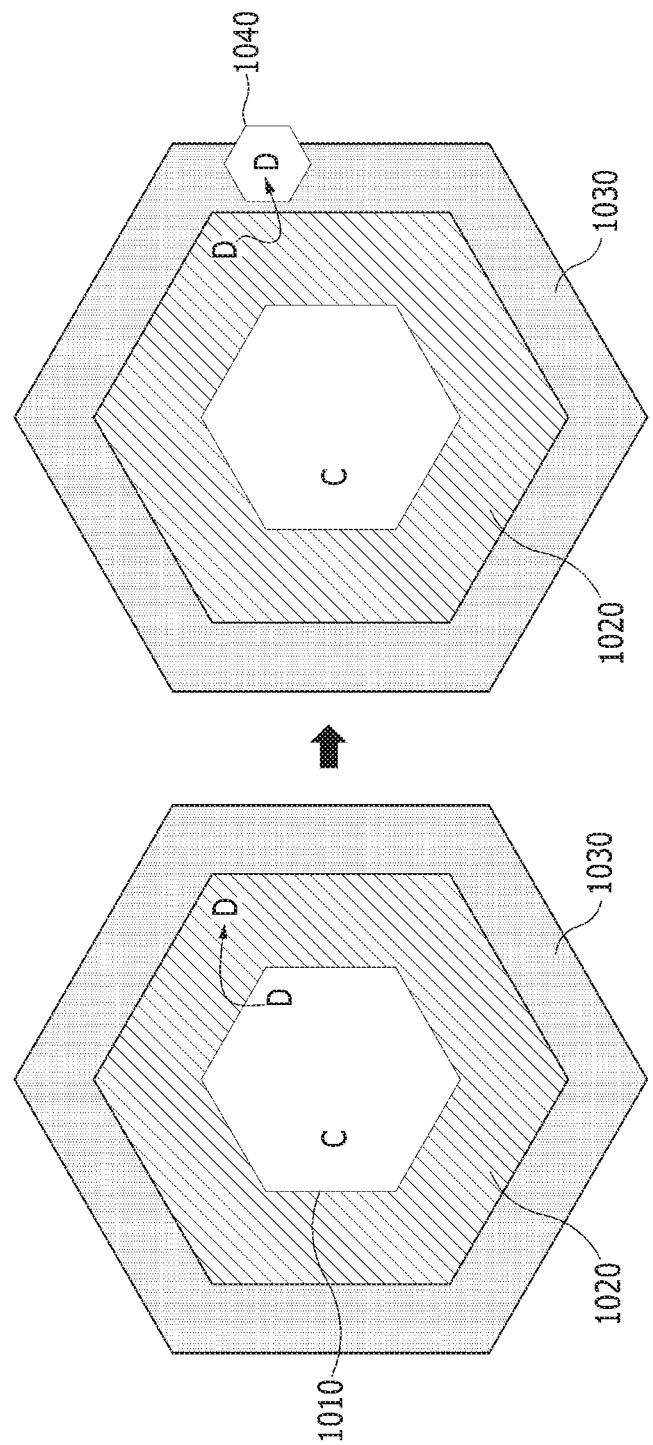

FIG. 10 illustrates the cell separation scenario according to a third exemplary embodiment. Here, FIG. 10 illustrates an example of separating the floating cell depending on the location movement of the terminal apparatus within the floating cell in the state in which the plurality of terminal apparatuses are present within three floating cells generated to correspond to three available channels.

As illustrated in FIG. 10, when the number of available channels is three, the controller 110 may configure a first floating cell 1010 providing a service requested to the terminal apparatuses C and D, configure a second floating cell 1020 of a larger area that is at an outside of the first floating cell 1010 to include the first floating cell 1010, and configure a third floating cell 1030 that is at an outside the second floating cell 1020 to include the second floating cell 1020.

Therefore, the base station may provide the terminal apparatuses C and D within the first floating cell 1010 with the mobile communication service based on the beam forming scheme through the first channel and provide the terminal apparatuses within the second floating cell 1020 and the third floating cell 1030 with the mobile communication service based on the beam forming scheme through the second channel and the third channel, respectively.

In the case of the exemplary embodiment of FIG. 10, the controller 110 determines the cell separation timing for the corresponding terminal apparatus based on timing at which the location of the terminal apparatus moves to the third floating cell 1030.

In other words, if the location of the terminal apparatus D of the terminal apparatuses C and D within the first floating cell 1010 moves to the area of the second floating cell 1020, the base station may provide the terminal apparatus C within the first floating cell 1010 with the mobile communication service based on the beam forming scheme through the first channel and provide the terminal apparatus D within the second floating cell 1020 with the mobile communication service based on the beam forming scheme through the second channel.

Meanwhile, if the location of the terminal apparatus D moves to the third floating cell 1030, the determination unit 140 may determine whether to generate and separate the floating cell 1040 corresponding to the terminal apparatus D from the third floating cell 1030 on the basis of the information stored in the cell separation scenario.

If the determination unit 140 confirms that the cell generation and the cell separation are possible, the controller 110 generates the floating cell 1040 corresponding to the terminal apparatus D from the third floating cell 1030 and separates the floating cell 1040. At this point, the base station provides the terminal apparatus D within the floating cell 1040 separated from the third floating cell 1030 with the mobile communication service based on the beam forming scheme through the first channel.

In this case, since the first floating cell 1010 and the third floating cell 1030 are spaced apart form each other at a predetermined distance, both of the terminal apparatuses C and D are less likely to cause the signal interference even if they provide the mobile communication service based on the beam forming scheme through the first channel. Further, it is also less likely to enter the terminal apparatus D from the separated floating cell 1040 into the first floating cell 1010 at a time.

Figure 11:
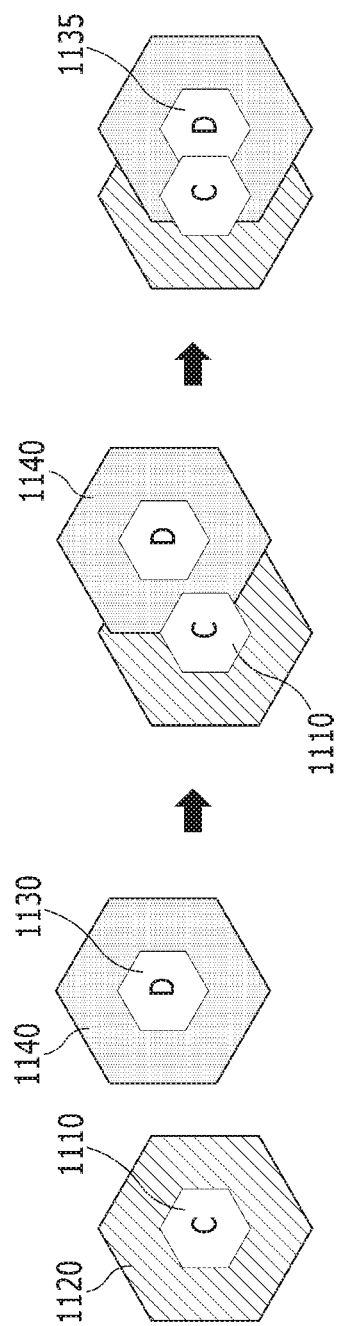

FIG. 11 illustrates the cell collision scenario according to the first exemplary embodiment. Here, FIG. 11 illustrates a channel interference avoidance operation in the case in which the respective floating cells collide with each other when the floating cells corresponding to different terminal apparatuses are each present.

As illustrated in FIG. 11, the floating cell corresponding to the terminal apparatus C has two available channels. At this time, the floating cell may include a first floating cell 1110 providing the mobile communication service based on the beam forming scheme through the first channel and a second floating cell 1120 providing the mobile communication service based on the beam forming scheme through the second channel.

Meanwhile, the floating cell corresponding to the terminal apparatus D spaced apart from the floating cell corresponding to the terminal apparatus C at a predetermined distance has two available channels. At this time, the floating cell may include a third floating cell 1130 providing the mobile communication service based on the beam forming scheme through the first channel and a fourth floating cell 1140 providing the mobile communication service based on the beam forming scheme through a third channel.

Here, the base station may provide the terminal apparatus C within the first floating cell 1110 and the terminal apparatus D within the third floating cell 1030 with the mobile communication service based on the beam forming scheme through the first channel.

Since both of the first floating cell 1110 and the third floating cell 1130 receive a service through the same first channel, when the respective floating cells inlay each other, the signal interference may occur between the terminal apparatus C and the terminal apparatus D due to the cell collision. At this time, the terminal apparatus C and/or the terminal apparatus D may transmit the cell collision information to the base station.

For example, the terminal apparatus C may receive a signal of the fourth floating cell 1140 and transmit the cell collision information to the base station when receiving the signal of the fourth floating cell 1140. Further, the terminal apparatus D may receive a signal of the second floating cell 1120 and transmit the cell collision information to the base station when receiving the signal of the second floating cell 1120.

The determination unit 140 may recognize the cell collision on the basis of the cell collision information from the terminal apparatus C and/or the terminal apparatus D and determine whether the cell collision avoidance may be made on the basis of the cell collision scenario stored in the storage unit 130.

If the determination unit 140 confirms that the cell collision avoidance may be made, the controller 110 may change a service providing channel of the third floating cell 1130 from the first channel to the fourth channel to avoid the signal interference between the terminal apparatus C and the terminal apparatus D or change a service providing channel of the first floating cell 1110 from the first channel to the fourth channel. Here, the controller 110 may determine whether to change a channel of which one of the first floating cell 1110 and the third floating cell 1130 according to the operation policy stored in the cell collision scenario.

Further, the determination unit 140 may previously determine whether the cell collision occurs on the basis of the location information of the terminal apparatuses C and D understood in the base station and the controller 110 may previously change the channel of the floating cell to which the terminal apparatus C or D belong before the cell collision.

If the first floating cell 1110 and the fourth floating cell 1140 are out of the cell collision situation or the second floating cell 1120 and the third floating cell 1130 are out of the cell collision situation depending on the location movement of the terminal apparatus C and/or the terminal apparatus D, the terminal apparatus C and/or D may transmit the cell collision release information to the base station. In this case, the controller 110 recovers the service providing channel of the floating cell in which the channel is changed.

Figure 12:
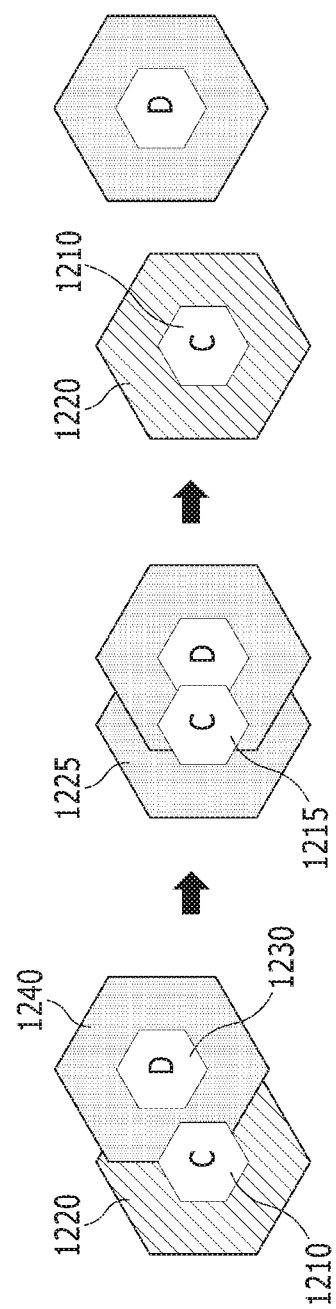

FIG. 12 illustrates the cell collision scenario according to a second exemplary embodiment. Here, FIG. 12 illustrates the channel interference avoidance operation when the respective floating cells collide with each other in the case in which the floating cells served by different base stations are each present.

As illustrated in FIG. 12, the floating cell corresponding to the terminal apparatus C has two available channels. At this time, the floating cell may include a first floating cell 1210 providing the mobile communication service based on the beam forming scheme through the first channel and a second floating cell 1220 providing the mobile communication service based on the beam forming scheme through the second channel.

Therefore, the first base station may provide the terminal apparatus C within the first floating cell 1210 with the mobile communication service based on the beam forming scheme through the first channel.

Meanwhile, the floating cell corresponding to the terminal apparatus D spaced apart from the floating cell corresponding to the terminal apparatus C at a predetermined distance has two available channels. At this time, the floating cell may include a third floating cell 1230 providing the mobile communication service based on the beam forming scheme through the first channel and a fourth floating cell 1240 providing the mobile communication service based on the beam forming scheme through a third channel.

Therefore, the second base station may provide the terminal apparatus D within the third floating cell 1230 with the mobile communication service based on the beam forming scheme through the first channel.

Since both of the first floating cell 1210 and the third floating cell 1230 receive a service through the same first channel, when the respective floating cells inlay each other, the signal interference may occur between the terminal apparatus C and the terminal apparatus D due to the cell collision. At this time, the terminal apparatus C and/or the terminal apparatus D may transmit the cell collision information to the corresponding base station.

For example, when the terminal apparatus C receives a signal of the fourth floating cell 1240, the terminal apparatus C may transmit the cell collision information to the first base station together with the channel information of the fourth floating cell 1240.

The determination unit 140 corresponding to the first base station may recognize the cell collision on the basis of the cell collision information from the terminal apparatus C and determine whether the cell collision avoidance may be made on the basis of the cell collision scenario stored in the storage unit 130.

If the determination unit 140 confirms that the cell collision avoidance may be made, as illustrated in FIG. 12, the controller 110 may change a service providing channel of the first floating cell 1210 from the first channel to the fourth channel to avoid the signal interference between the terminal apparatus C and the terminal apparatus D or change a service providing channel of the second floating cell 1220 to the same channel as the fourth floating cell 1240. In this case, the terminal apparatus D may recognize the second floating cell 1220 as the fourth floating cell 1240 not to sense the cell collision.

If the first floating cell 1210 and the fourth floating cell 1240 are out of the cell collision situation depending on the location movement of the terminal apparatus C and/or the terminal apparatus D, the terminal apparatus C may transmit the cell collision release information to the first base station. In this case, the controller 110 needs to recover the service providing channels of the first floating cell 1210 and the second floating cell 1220 to the first channel and the second channel, respectively.

As another example, when the terminal apparatus D may receive the signal of the second floating cell 1220, the terminal apparatus D may transmit the cell collision information to the second base station together with the channel information of the second floating cell 1220.

The determination unit 140 corresponding to the second base station may recognize the cell collision on the basis of the cell collision information from the terminal apparatus C and determine whether the cell collision avoidance may be made on the basis of the cell collision scenario stored in the storage unit 130.

If the determination unit 140 confirms that the cell collision avoidance may be made, the controller 110 may change the service providing channel of the third floating cell 1230 from the first channel to the fourth channel to avoid the signal interference between the terminal apparatus C and the terminal apparatus D or change the service providing channel of the fourth floating cell 1240 to the same channel as the second floating cell 1220. In this case, the terminal apparatus C may recognize the fourth floating cell 1240 as the second floating cell 1220 not to sense the cell collision.

If the second floating cell 1220 and the third floating cell 1230 are out of the cell collision situation depending on the location movement of the terminal apparatus C and/or the terminal apparatus D, the terminal apparatus D may transmit the cell collision release information to the second base station. In this case, the controller 110 needs to recover the service providing channels of the third floating cell 1230 and the fourth floating cell 1240 to the first channel and the third channel, respectively.

Figure 13:
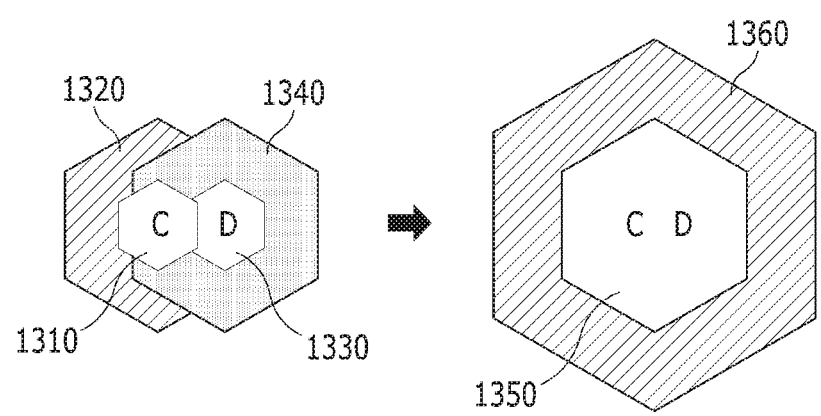

FIG. 13 illustrates the cell coupling scenario.

As illustrated in FIG. 13, the floating cell corresponding to the terminal apparatus C has two available channels. At this time, the floating cell may include a first floating cell 1310 providing the mobile communication service based on the beam forming scheme through the first channel and a second floating cell 1320 providing the mobile communication service based on the beam forming scheme through the second channel.

Meanwhile, the floating cell corresponding to the terminal apparatus D spaced apart from the floating cell corresponding to the terminal apparatus C at a predetermined distance has two available channels. At this point, the floating cell may include a third floating cell 1330 providing the mobile communication service based on the beam forming scheme through the first channel and a fourth floating cell 1340 providing the mobile communication service based on the beam forming scheme through a third channel.

As illustrated in FIG. 11, if the cell collision occurs and thus the cell collision situation is continued for a predetermined time in the state in which the channel of the floating cell of which one of the first floating cell 1310 and the third floating cell 1330 is changed, the determination unit 140 may determine whether the floating cells corresponding to the terminal apparatuses C and D may be coupled on the basis of the information stored in the cell coupling scenario.

If the determination unit 140 confirms that the cell coupling may be made, the controller 110 may couple the floating cells corresponding to the terminal apparatuses C and D on the basis of the cell coupling scenario.

Here, initial service providing channels of the first floating cell 1310 and the third floating cell 1330 are a first channel, and therefore the controller 110 may be determine the first channel as the service providing channel of a floating cell 1350 in which the first floating cell 1310 and the third floating cell 1330 are coupled.

The second floating cell 1320 and the fourth floating cell 1340 provide services through different channels, and therefore the controller 110 may determine which one of the second channel and the third channel as a service providing channel of the floating cell 1360 in which the second floating cell 1320 and the fourth floating cell 1340 are coupled. Further, the controller 110 selects any one of the service providing channels according to the operation policy stored in the cell coupling scenario.

Meanwhile, as in the exemplary embodiment of FIG. 12, when the base stations managing the floating cells corresponding to the terminal apparatus C and the terminal apparatus D are different, the first base station may notify the cell coupling request of the floating cell corresponding to the terminal apparatus D to a second base station and the second base station may abandon an authority on the terminal apparatus D to perform the cell coupling by the controller 110 corresponding to the first base station.

The exemplary embodiment of FIG. 13 illustrates the case in which the number of available channels of the floating cell is two but the number of available channels is not limited thereto and therefore may be applied even to the case in which the number of available channels is one or two.

Figure 14:
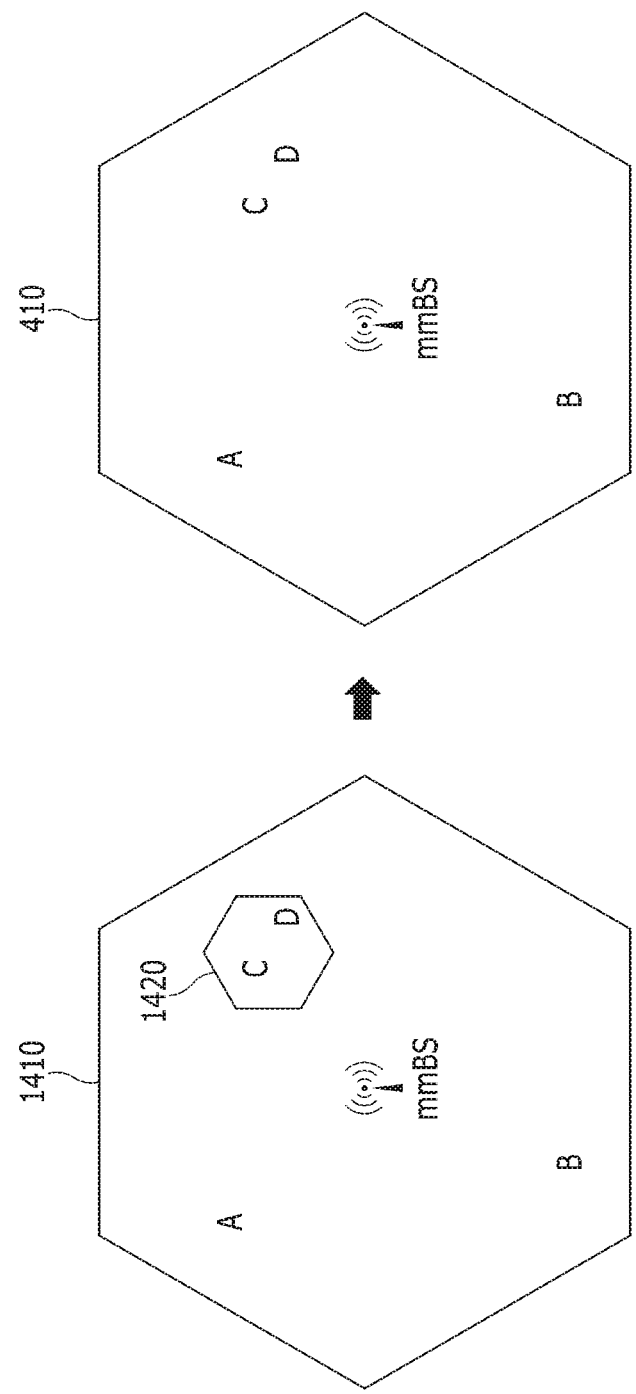

FIG. 14 illustrates the cell extinction scenario.

As illustrated in FIG. 14, when terminal apparatuses C and D of terminal apparatuses A, B, C, and D located within coverage of a fixed cell 1410 request a service provided by the floating cell, the base station (BS) may configure the floating cell including the terminal apparatuses C and D to provide the mobile communication service based on the beam forming scheme.

If the terminal apparatuses C and D request the release of the high speed data service, the determination unit 140 may determine whether the cell extinction may be made on the basis of the information stored in the cell extinction scenario.

If the determination unit 140 confirms that the extinction of the floating cell including the terminal apparatuses C and D may be made, the controller 110 may be extinct the corresponding floating cell depending on the cell extinction scenario of the terminal apparatus.

If the floating cell including the terminal apparatuses C and D is extinct, the base station provides the terminal apparatuses C and D with the mobile communication service based on the cellular scheme provided from the fixed cell.

Further, if the plurality of terminal apparatuses are included in the floating cell, the cell may be extinct when the plurality of terminal apparatuses request the release of the high speed data service. Meanwhile, when the floating cells corresponding to the plurality of terminal apparatuses, respectively, are present, the controller 110 may process the cell release operation only on the requested floating cell if the respective terminal apparatuses request the release of the service provided by the floating cell.

The operation flow of the apparatus for cell management in a mobile communication system according to the present invention configured as described above will be described below in more detail.

Figure 15:
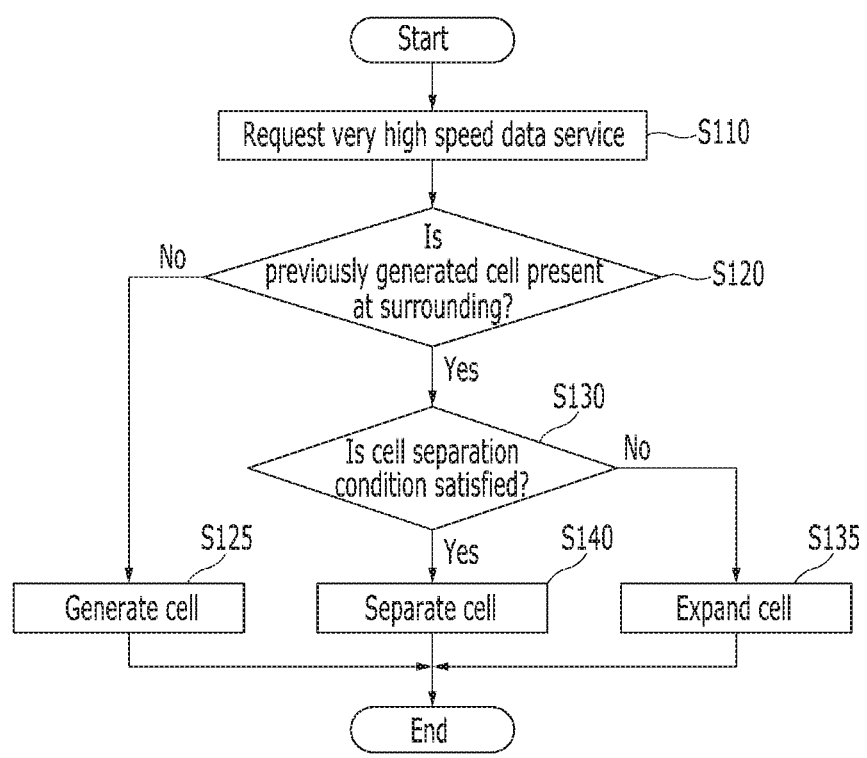
FIG. 15, FIG. 16, and FIG. 17 are flow charts illustrating an operation flow of a method for cell management in a mobile communication system according to an exemplary embodiment of the present invention.
Figure 16:
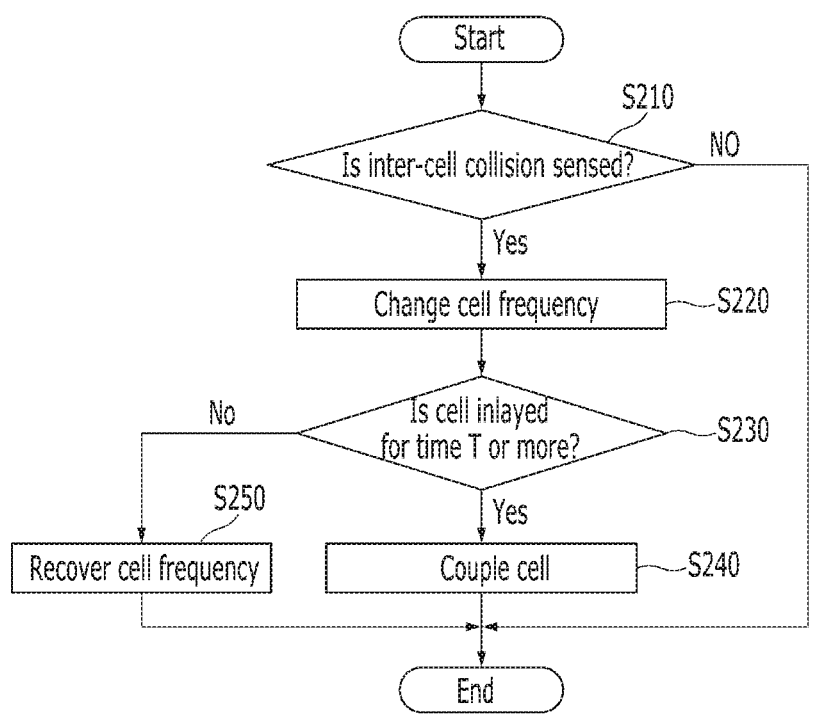
Figure 17:
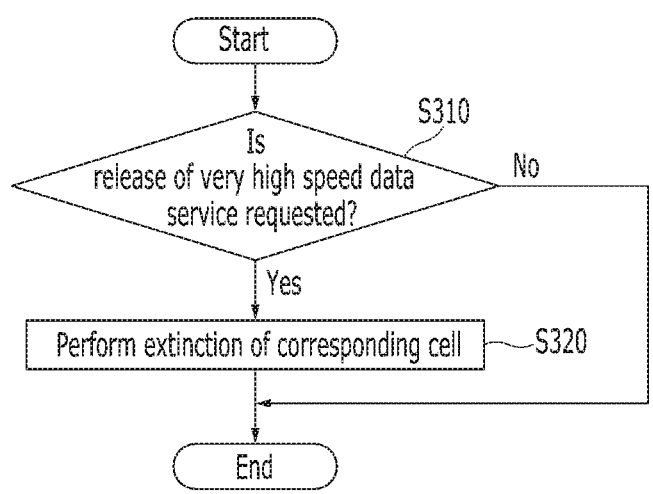

FIG. 15, FIG. 16, and FIG. 17 are flow charts illustrating an operation flow of a method for cell management in a mobile communication system according to an exemplary embodiment of the present invention.

First, FIG. 15 illustrates the operation flow of the generation, separation, and expansion of the cell.

The base station provides the terminal apparatus located in the fixed cell with the mobile communication service based on the cellular scheme supporting the low speed and/or medium speed data service.

As illustrated in FIG. 15, if at least one terminal apparatus located within the fixed cell requests the service provided by the floating cell (S110), the apparatus for cell management according to the present invention confirms whether the previously generated floating cell is present around the corresponding terminal apparatus (S120).

As the confirmation result of the process S120, if the previously generated floating cell is not present around the corresponding terminal apparatus, the apparatus for cell management generates the floating cell corresponding to the corresponding terminal apparatus (S125). Here, the detailed description of the cell generation operation will be described with reference to the exemplary embodiment of FIG. 3. In this case, the base station may provide the mobile communication service based on the beam forming scheme supporting the service requested to the corresponding terminal apparatus through the floating cell generated in the process S125.

Meanwhile, as the confirmation result of the process S120, when the previously generated floating cell is present around the corresponding terminal apparatus, the apparatus for cell management confirms whether to confirm the cell separation condition of the previously generated floating cell for the corresponding terminal apparatus (S130). Here, the cell separation condition is stored in the pre-stored cell separation scenario.

If the cell separation condition of the previously generated floating cell for the corresponding terminal apparatus is not satisfied in the step S130, the apparatus for cell management expands the generated floating cell on the basis of the location of the corresponding terminal apparatus (S135). Here, the detailed description of the cell expansion operation will be described with reference to the exemplary embodiment of FIGS. 4 to 6.

On the other hand, when the cell separation condition of the previously generated floating cell for the corresponding terminal apparatus is satisfied in the process S130, the apparatus for cell management separates the floating cell (second floating cell) corresponding to the corresponding terminal apparatus from the previously generated floating cell (first floating cell) (S140). Here, the detailed description of the cell separation operation will be described with reference to the exemplary embodiment of FIGS. 9 and 10.

In this case, the base station may provide the corresponding terminal apparatus with the mobile communication service based on the beam forming scheme supporting the very high speed data service through the floating cell expanded in the process S135 or the floating cell (second floating cell) separated in the process S140.

FIG. 16 illustrates an operation flow of the cell collision avoidance and the cell coupling.

When at least two floating cells are present within the fixed cell of the base station, the terminal apparatuses of the respective floating cells may transmit the cell collision information to the base station.

As illustrated in FIG. 16, the apparatus for cell management changes the channel frequency of the floating cell to which the corresponding terminal apparatus belongs if the inter-cell collision is sensed on the basis of the cell collision information transmitted from any one terminal apparatus (S220).

If at least two floating cells in which the cell collision occurs is not in the inlayed state for a set time T or more (S230), the apparatus for cell management recovers the channel frequency of the floating cell changed in the process S220 to an original channel frequency (S230). Here, the detailed description of the cell collision avoidance operation will be described with reference to the exemplary embodiment of FIGS. 11 and 12.

On the other hand, if at least two floating cells in which the cell collision occurs is in the inlayed state for the set time T or more (S230), the apparatus for cell management couples the inlayed floating cells on the basis of the information stored in the cell coupling scenario (S240). Here, the detailed description of the cell coupling operation will be described with reference to the exemplary embodiment of FIG. 13. In this case, the base station may provide the terminal apparatuses within the floating cell coupled in the process S240 with the mobile communication service based on the beam forming scheme supporting the very high speed data service.

FIG. 17 illustrates the operation flow of the cell extinction.

When at least one floating cell is present within the fixed cell of the base station, the base station provides the terminal apparatus within the floating cell with the mobile communication service based on the beam forming scheme.

As illustrated in FIG. 17, when the terminal apparatus within the floating cell requests the release of the very high speed data service (S310), the apparatus for cell management performs the extinction of the floating cell corresponding to the corresponding terminal apparatus.

In this case, the base station may stop the mobile communication service based on the beam forming scheme that is provided to the corresponding terminal apparatus and provide the corresponding terminal apparatus with the mobile communication service based on the cellular scheme through the fixed cell.

The apparatus for cell management in a mobile communication system according to the present exemplary embodiment operated as described above may be implemented in a form of an independent hardware apparatus. Meanwhile, the apparatus for cell management according to the present exemplary embodiment may be driven in a form in which it is included in a microprocessor as at least one processor or other hardware apparatuses like a general-purpose computer system.

Figure 18:
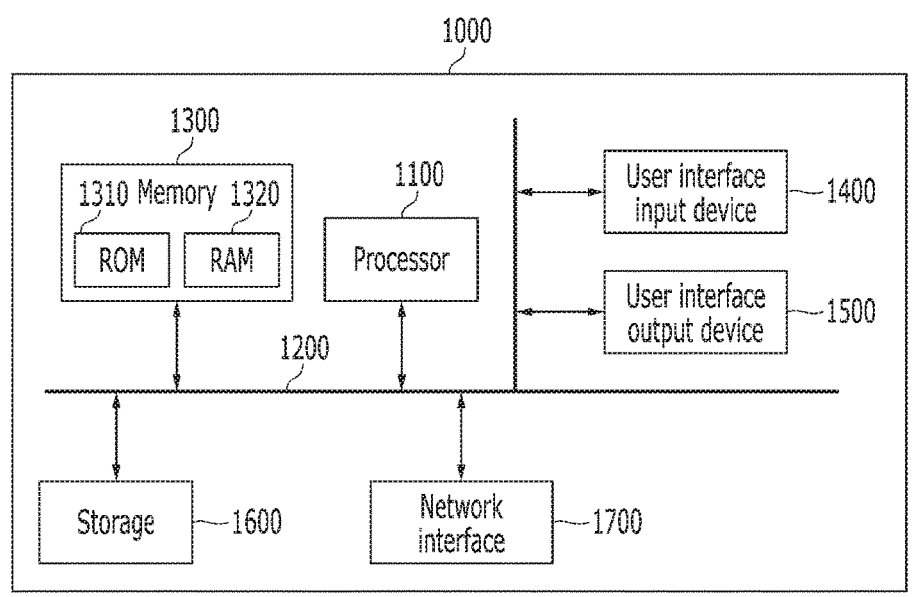
FIG. 18 is a diagram illustrating a computing system to which the apparatus according to the exemplary embodiment of the present invention is applied.

FIG. 18 is a diagram illustrating a computing system to which the apparatus according to the exemplary embodiment of the present invention is applied.

Referring to FIG. 18, a computing system 1000 may include at least one processor 1100, a memory 1300, a user interface input device 1400, a user interface output device 1500, a storage 1600, and a network interface 1700 that are connected via a bus 1200.

The processor 1100 may be a semiconductor device that executes processing on commands stored in a central processing unit (CPU) or the memory 1300 and/or storage 1600. The memory 1300 and the storage 1600 may include various kinds of volatile or non-volatile storage media. For example, the memory 1300 may include a read only memory (ROM) and a random access memory (RAM).

Therefore, steps of a method or an algorithm described with the exemplary embodiment disclosed in the present specification may be directly implemented by a hardware module, a software module, or a combination thereof that are executed by the processor 1100. The software module may also reside in a RAM memory, a flash memory, a ROM memory, an EPROM memory, an EEPROM memory, a register, a hard disk, a detachable disk, storage media (that is, memory 1300 and/or storage 1600) like CD-ROM. The exemplary storage media are coupled with the processor 1100 and the processor 1100 may read information from the storage media and record the information in the storage media. As another method, the storage media may also be integrated with the processor 1100. The processor and the storage media may also reside in an application specific integrated circuit (ASIC). The ASIC may also reside in a user terminal. As another method, the processor and the storage medium which are individual components may also reside in the user terminal.

According to an exemplary embodiment of the present invention, it is possible to seamlessly provide the user with the mobile communication service based on the beam forming scheme to effectively cope with the generation, expansion, reduction, separation, collision, coupling, and extinction of the cell in the mobile communication system based on the beam forming scheme.

The spirit of the present invention has been just exemplified. It will be appreciated by those skilled in the art that various modifications and alterations can be made without departing from the essential characteristics of the present invention.

Accordingly, the exemplary embodiments disclosed in the present invention and the accompanying drawings are used not to limit but to describe the spirit of the present invention. The scope of the present invention is not limited only to the embodiments and the accompanying drawings. The scope of the present invention should be interpreted by the following claims, and it should be interpreted that all the spirits equivalent to the following claims fall within the scope of the present invention.

What is claimed is:

1. An apparatus for cell management in a mobile communication system based on a beam forming scheme, the apparatus comprising:
a storage unit storing a cell management scenario for at least one floating cell inlayed with a fixed cell of a base station and managed by the base station or another base station;
a determination unit determining a processing scheme of the at least one floating cell on the basis of the cell management scenario stored in the storage unit when a service request event is generated within the fixed cell; and
a controller processing the at least one floating cell depending on the determination of the determination unit, wherein
the cell management scenario includes a cell generation scenario, a cell separation scenario, a cell coupling scenario and a cell extinction scenario, each of which includes at least one of an operation policy, an operation condition and a setup value, respectively for generation, separation, coupling and extinction of the at least one floating cell.

2. The apparatus of claim 1, wherein:
the at least one floating cell comprises a first floating cell,
the cell management scenario further comprises a cell expansion scenario, and
the determination unit determines whether a cell expansion of the first floating cell is made on the basis of the cell expansion scenario when the first floating cell is present within a set distance from a terminal apparatus.

3. The apparatus of claim 2, wherein:
the controller expands the first floating cell on the basis of the cell expansion scenario when it is confirmed that the cell expansion of the first floating cell is made and determines a central location of the expanded first floating cell depending on a transmission quality state of the terminal apparatus included in the expanded first floating cell so that entire transmission capacity within the expanded first floating cell is maximal.

4. The apparatus of claim 1, wherein:
the at least one floating cell comprises a first floating cell and a second floating cell,
and
the determination unit determines whether a generation or a separation of the second floating cell corresponding to a terminal apparatus is made on the basis of the cell generation scenario or the cell separation scenario, when the first floating cell is not present within a set distance from the terminal apparatus.

5. The apparatus of claim 4, wherein:
the determination unit confirms a cell separation reference on the basis of the cell separation scenario and determines whether the separation of the second floating cell corresponding to the terminal apparatus from the floating cell is made depending on the confirmed cell separation reference.

6. The apparatus of claim 1, wherein:
the at least one floating cell comprises a first floating cell and a second floating cell, and
the determination unit determines whether a separation of the second floating cell corresponding to a first terminal apparatus from the first floating cell is made on the basis of at least one of cell information of the first floating cell and a location of the first terminal apparatus when the first terminal apparatus of a plurality of terminal apparatuses included in the first floating cell moves to an outside of the first floating cell.

7. The apparatus of claim 1, wherein:
the at least one floating cell comprises a first floating cell, and
the controller changes a service providing channel of the first floating cell including a first terminal apparatus from a first channel to a second channel when cell collision information is received from the first terminal apparatus receiving services provided by the first floating cell inlayed within the fixed cell of the base station.

8. The apparatus of claim 7, wherein:
the controller recovers the service providing channel of the first floating cell including the first terminal apparatus to the first channel when cell collision release information is received from the first terminal apparatus.

9. The apparatus of claim 7, wherein:
the controller couples the first floating cell and a second floating cell when the first floating cell and the second floating cell confirmed from the cell collision information maintain an inlayed state for a set time or more.

10. The apparatus of claim 9, wherein:
the controller selects one of service providing channels of the first floating cell and the second floating cell and determines the selected service providing channel as a service providing channel of the coupled floating cell.

11. The apparatus of claim 9, wherein:
the controller notifies the another base station of a cell coupling request when at least one of the first floating cell and the second floating cell confirmed from the cell collision information is managed by the another base station.

12. The apparatus of claim 1, wherein:
the at least one floating cell comprises a first floating cell, and
the controller performs extinction of the first floating cell when a release request of the service provided by the first floating cell is received from a first terminal apparatus receiving services provided by the first floating cell inlayed within the fixed cell of the base station.

13. The apparatus of claim 1, wherein:
the at least one floating cell comprises a plurality of first floating cells, and
the controller inlays the plurality of first floating cells having different coverages with each other depending on a plurality of available service channels.

14. The apparatus of claim 1, wherein:
the service request event is requested by at least one of terminal apparatuses located within coverage of the fixed cell.

15. The apparatus of claim 1, wherein:
the service request event is requested by the base station when traffic is offloaded for a load dispersion of the fixed cell.

16. The apparatus of claim 1, wherein:
the at least one floating cell comprises a first floating cell, and
the base station provides a first terminal apparatus within the first floating cell with a mobile communication service based on a beam forming scheme and provides a second terminal apparatus not included in the first floating cell, but included in the fixed cell, with a mobile communication service based on a cellular scheme.

17. A method for cell management in a mobile communication system based on a beam forming scheme, the method comprising:
storing a cell management scenario for at least one floating cell inlayed with a fixed cell of a base station and managed by the base station or another base station;
determining a processing scheme of the at least one floating cell on the basis of the cell management scenario when a service request event is generated within the fixed cell; and
processing the at least one floating cell depending on the determination, wherein
the cell management scenario includes a cell generation scenario, a cell separation scenario, a cell coupling scenario and a cell extinction scenario, each of which includes at least one of an operation policy, an operation condition and a setup value, respectively for generation, separation, coupling and extinction of the at least one floating cell.

18. A mobile communication system, comprising:
a base station providing a first terminal apparatus within a fixed cell of a base station with a mobile communication service based on a cellular scheme and providing a second terminal apparatus included in at least one floating cell inlayed with the fixed cell and managed by the base station or another base station with a mobile communication service based on a beam forming scheme; and
an cell management apparatus storing a cell management scenario and processing the at least floating cell on the basis of the cell management scenario, wherein
the cell management scenario includes a cell generation scenario, a cell separation scenario, a cell coupling scenario and a cell extinction scenario, each of which includes at least one of an operation policy, an operation condition and a setup value, respectively for generation, separation, coupling and extinction of the at least one floating cell.

19. The apparatus of claim 1, wherein the cell management scenario further includes a cell reduction scenario and a cell collision scenario, respectively for reduction and collision avoidance of the at least one floating cell.

* * * * *